(12) United States Patent
Kamkar-Parsi et al.

(10) Patent No.: US 10,547,956 B2
(45) Date of Patent: Jan. 28, 2020

(54) METHOD OF OPERATING A HEARING AID, AND HEARING AID

(71) Applicant: SIVANTOS PTE. LTD., Singapore (SG)

(72) Inventors: Homayoun Kamkar-Parsi, Erlangen (DE); Marko Lugger, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 77 days.

(21) Appl. No.: 15/843,232

(22) Filed: Dec. 15, 2017

(65) Prior Publication Data

US 2018/0176698 A1 Jun. 21, 2018

(30) Foreign Application Priority Data

Dec. 15, 2016 (DE) .................. 10 2016 225 204

(51) Int. Cl.
*H04R 25/00* (2006.01)

(52) U.S. Cl.
CPC ......... *H04R 25/505* (2013.01); *H04R 25/405* (2013.01); *H04R 25/407* (2013.01); *H04R 25/552* (2013.01); *H04R 2225/41* (2013.01); *H04R 2225/43* (2013.01)

(58) Field of Classification Search
CPC .. H04R 25/505; H04R 25/405; H04R 25/407; H04R 25/552; H04R 2225/41; H04R 2225/43; G10L 17/00; G10L 21/028
USPC ...................................................... 381/23.1
See application file for complete search history.

(56) References Cited

U.S. PATENT DOCUMENTS

| 6,910,013 | B2 | 6/2005 | Allegro et al. |
| 8,638,952 | B2 | 1/2014 | Matsuo |
| 8,654,998 | B2 | 2/2014 | Nomura et al. |
| 2004/0047474 | A1* | 3/2004 | Vries .............. H04R 25/70 381/60 |
| 2007/0160242 | A1 | 7/2007 | Cadalli et al. |
| 2012/0063620 | A1* | 3/2012 | Nomura .............. H04R 25/407 381/316 |
| 2015/0036850 | A1 | 2/2015 | Barthel |

FOREIGN PATENT DOCUMENTS

| DE | 102010023615 A1 | 1/2011 |
| DE | 102013215131 A1 | 2/2015 |
| DE | 102015212609 A1 | 9/2016 |
| EP | 1691576 A2 | 8/2006 |
| JP | S57148413 A | 9/1982 |
| JP | H06105399 A | 4/1994 |
| JP | 2009044588 A | 2/2009 |
| JP | 2016201595 A | 12/2016 |
| WO | 2010146857 A1 | 12/2010 |

* cited by examiner

*Primary Examiner* — Vivian C Chin
*Assistant Examiner* — Douglas J Suthers
(74) *Attorney, Agent, or Firm* — Laurence A. Greenberg; Werner H. Stemer; Ralph E. Locher

(57) ABSTRACT

A hearing aid includes at least a first input transducer and a second input transducer. The first input transducer generates a first input signal from a surrounding sound signal and the second input transducer generates a second input signal from the sound signal. A first direction is assigned to a first signal source. A first directional signal that is aligned in the first direction is formed on the basis of the first input signal and the second input signal. Signal components of the first directional signal are examined for the presence of a useful signal from a useful signal source that is predetermined in view of its type.

20 Claims, 1 Drawing Sheet

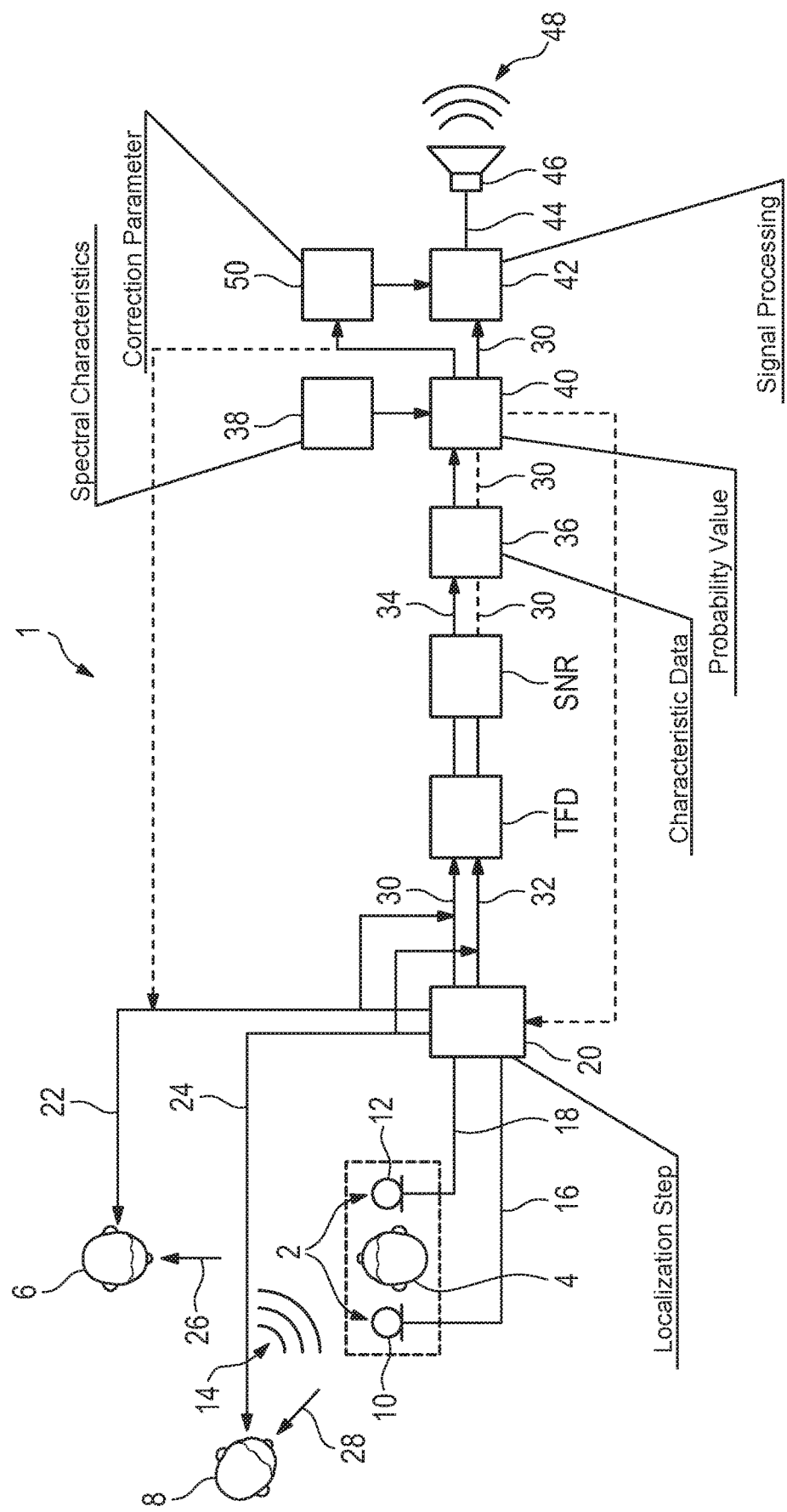

METHOD OF OPERATING A HEARING AID, AND HEARING AID

CROSS-REFERENCE TO RELATED APPLICATION

This application claims the benefit, under 35 U.S.C. § 119, of German patent application DE 10 2016 225 204.6, filed Dec. 15, 2016; the prior application is herewith incorporated by reference in its entirety.

BACKGROUND OF THE INVENTION

Field of the Invention

The invention relates to a method for operating a hearing aid and to a hearing aid which comprises at least a first input transducer and a second input transducer, wherein the first input transducer generates a first input signal from a sound signal from the surroundings and the second input transducer generates a second input signal from the sound signal. A first directional signal that is aligned in a first direction is formed on the basis of the first input signal and the second input signal.

One of the core problems in the context of hearing aids lies in the handling of conversation situations. This is firstly due to the circumstance that important information is often conveyed to the user of a hearing aid during a personal conversation. Thus, if only for the purposes of information transfer that is as reliable as possible, it is already important to attribute particular significance to the intelligibility of speech for the user of a hearing aid. However, on the other hand, speech intelligibility, in particular, often already is impaired by the fact that typical conversation situations are superposed with a high component of surrounding and interfering noises, as may be the case, for example, during a conversation with a plurality of interlocutors who not only express themselves orderly in succession, or in the case of dialogue in a closed room, in which further groups of people in turn contribute to an elevated noise level through conversations (a so-called "cocktail party" hearing situation).

In order to improve the speech intelligibility of the signal from an interlocutor, modern hearing aids often apply a directional microphone algorithm, by means of which a narrow directional characteristic, e.g. a directional cone, is aligned in the direction of the interlocutor. Such a directional cone as a filter over the input signals of the hearing aid leads to the speech signal of the interlocutor being amplified while noises that originate from a different direction are substantially suppressed.

Previous algorithms for improving the speech intelligibility, which mask background noise by means of a directional characteristic, normally are insufficient for a hearing situation in which the interlocutor of a user of a hearing aid moves relative to the user as the corresponding directional characteristic would have to be adapted continuously to the changing position of the interlocutor; however, precisely this leads to complications if the moving interlocutor is not the only speaker in the vicinity of the user and an identification of the position of the interlocutor consequently is made significantly more difficult on account of the presence of the other speakers. Moreover, not only is the ascertainment of the position of the moving interlocutor of high numerical complexity in this case, but the robustness of a speaker-specific suppression of the background noise also becomes a significant problem for moving speakers on account of the restricted available resources in a hearing aid, i.e. the position of the moving interlocutor is lost in the case of an insufficiently robust algorithm and there can be no more satisfactory noise suppression. What makes this even more difficult is that an improvement in the speech quality of an interlocutor by means of a directional characteristic that masks background noises becomes ever more important as the signal-to-noise ratio (SNR) of the speech signal reduces. However, particularly a low SNR leads to problems when capturing the position of a moving interlocutor or when attempting to capture the moving interlocutor by means of a directional characteristic.

However, said problems are not only restricted to the conversation contributions by an interlocutor but, in general, may always occur for the user of a hearing aid when such a known or identifiable sound source, known per se, should be tracked along a relative movement with respect to the user, i.e., for example, a pet in a park or a motorized road user in traffic.

German published patent application DE 10 2013 215 131 A1 specifies, for a hearing aid, the formation of a directional signal from at least two microphone signals, the capture of an acoustic signal to be used in the directional signal and an evaluation of the acoustic signal to the extent of whether the latter is, for example, speech, music, noise or the like.

SUMMARY OF THE INVENTION

It is accordingly an object of the invention to provide a hearing aid and a method of operating a hearing aid which overcome the above-mentioned and other disadvantages of the heretofore-known devices and methods of this general type and which provides for a method for a hearing aid, the method allowing the localization of a predetermined useful signal source in the presence of a plurality of signal sources or significant background noise in a manner that is as simple and resources-sparing as possible.

With the above and other objects in view there is provided, in accordance with the invention, a method of operating a hearing aid having a first input transducer for generating a first input signal from an ambient sound signal and a second input transducer for generating a second input signal from the sound signal, the method comprising:

assigning a first direction to a first signal source;

forming a first directional signal that is aligned in the first direction based on the first input signal and the second input signal;

examining signal components of the first directional signal for a presence of a useful signal from a useful signal source that is predetermined in view of a type thereof;

predetermining spectral characteristics of the useful signal source for an examination of the signal components of the first directional signal for the presence of the useful signal; and ascertaining a probability value for signal components that are compatible with the spectral characteristics contained in the first directional signal and deducing that a useful signal is present if the probability value exceeds a predetermined first threshold.

In other words, the aforementioned object is achieved by a method for operating a hearing aid comprising at least a first input transducer and a second input transducer, wherein the first input transducer generates a first input signal from a sound signal from the surroundings and the second input transducer generates a second input signal from the sound signal, wherein a first direction is assigned to a first signal source, wherein a first directional signal that is aligned in the first direction is formed on the basis of the first input signal and the second input signal, and wherein at least signal components of the first directional signal are examined for the presence of a useful signal from a useful signal source that is predetermined in view of its type. Advantageous configurations and configurations which, in part, are inventive on their own are disclosed in the dependent claims and in the following description.

Here, in general, an input transducer comprises an acousto-electric transducer which is configured to generate an appropriate electric signal from a sound signal, i.e., for example, a microphone. Here, a directional signal should be understood to mean a signal which has a particularly high sensitivity to a reference sound from a reference sound source in a specific angular range and which has a significantly reduced sensitivity in respect of the reference sound when the reference sound source is arranged outside the given angular range. In particular, the directional signal can have a maximum in its sensitivity in respect of the reference sound at a given central angle, with the sensitivity in relation to the reference sound reducing with increasing angular distance from the central angle.

A useful signal source that is predetermined in view of its type comprises, in particular, a useful signal source which can be predetermined and/or identified on the basis of the spectral properties of the signal components of the produced useful signal, i.e., for example, a specific speaker, whose speech signal can be distinguished in the hearing aid on the basis of its spectral components and on the basis of the distribution of formats from the speech signals of other possible speakers.

Here, examining at least the signal components of the first directional signal for the presence of the useful signal facilitates, firstly, an improvement in the signal-to-noise ratio over the first directional signal. Here, the first directional signal can be formed by means of a suitably aligned directional characteristic in such a way that substantially only signal components of the first signal source are incorporated into the first directional signal and, correspondingly, sound from other signal sources, whether these be from further useful signal sources involved in the hearing situation or from sources of noise, are substantially suppressed. As a result of this, it is possible to substantially amplify the signal components corresponding to the first signal source in relation to the background noise, without the spectral properties of the signal components being adversely affected in the process.

Now, secondly, such an improvement in the signal-to-noise ratio by way of the first directional signal facilitates a substantially more robust ascertainment of the useful signal or an improvement in the identification of the first signal source with the useful signal source that is predetermined in view of its type. This is because such an identification, in particular on the basis of a comparison of the available spectral properties of the signal components in the first directional signal with reference values which define the useful signal source in view of its type or which are predetermined by the useful signal source, is more robust and less susceptible now to variations in the background noise as a consequence of the significantly lower noise component in the first directional signal since said background noise is largely masked for the ascertainment of the presence of the useful signal source. In particular, the first directional signal may have a directional characteristic in this case, the direction of maximum sensitivity of which deviates from the frontal direction of the user of the hearing aid such that the first signal source can assume, in particular, any angular position in the front hemisphere of the user for the purposes of carrying out the method.

Preferably, a position of the useful signal source is ascertained on the basis of the first input signal and the second input signal if the useful signal is present in the first directional signal and, if a change in the position of the useful signal source is ascertained, the first directional signal is aligned in the direction of the modified position of the useful signal source. In particular, this can be effectuated in such a way that the useful signal source with the first signal source is identified in the first directional signal if the useful signal is present, and consequently the first direction is assigned to the useful signal source as a position. Determining a change in the signal level of the first directional signal now renders it possible to deduce a change in the position or the angular position of the useful signal source, and so the first direction is newly determined. This may be effectuated dynamically depending on profile of the signal level in the first directional signal or periodically at predetermined time intervals. By way of the parameters known to the hearing aid, this facilitates the tracking in space of a useful signal source that is known in view of its type and that moves relative to the user and, accordingly, the permanent alignment on the useful signal source of a directional signal for the purposes of improving the signal quality and the signal-to-noise ratio.

Expediently, the position of the useful signal source is continuously updated if the useful signal is present in the first directional signal. Preferably, the alignment of the first directional signal moreover also is continuously updated in this case. In particular, this can facilitate an update of the alignment of the first directional signal, which leads to an increased power uptake of the hearing aid as a consequence of the high computational outlay, only being carried out for the case where a useful signal is present in the first directional signal, and so this allows battery power to be saved.

According to the invention, spectral characteristics of the useful signal source are predetermined for the examination of at least the signal components of the first directional signal for the presence of the useful signal, wherein a probability value is ascertained for signal components that are compatible with the spectral characteristics being contained in the first directional signal and a presence of the useful signal is deduced if a predetermined first threshold is exceeded by the probability value. In particular, this can be effectuated by way of the log likelihood ratio test (LLR) of a Gaussian mixture model (GMM), in which characteristics are ascertained or approximated by way of the mel-frequency cepstrum coefficients (MFCC) or by way of a GMM supervector support vector machine.

Since the useful signal source is predetermined in view of its type, this means that, firstly, spectral characteristics that are characteristic for the useful signal source, in particular in view of a distinction from other signal sources, can be used for examining the first directional signal. Secondly, a probability value for the relevant signal components originating from the useful signal source now is ascertained on the basis of the real signal components of the first directional signal by way of a suitable comparison method. Origination from the useful signal source can be excluded if the corresponding signal components are not compatible with the useful signal on account of their spectral components. In the case of increasing correspondence or compatibility of the spectral parameters of the signal components of the first directional signal and of the predetermined useful signal, there is a corresponding increase in the probability value, and so the assumption can be made above a predetermined threshold for the probability value that the signal components in fact originate from the desired useful signal source. Here, in particular, the probability value may depend on the hearing situation or a noise level.

Expediently, the spectral characteristics in this case are stored in a database of the hearing aid before the hearing aid is activated. Here, activation comprises both the first activation and an activation after a relatively long operational pause that is connected with an interim deactivation of the hearing aid. Here, in particular, storing may be effectuated within the scope of setting the default for, and/or adapting, the hearing aid by a hearing aid acoustic technician. To this end, the most common interlocutors of the user can be selected as default useful signal sources, the user supplying a number of sound samples for said interlocutors in each case. In particular, the sound samples may have been recorded, in particular, by an external apparatus such as a smartphone or by the hearing aid itself, which is preferably specifically prompted to this end by means of an external apparatus such as, for example, a remote control or a smartphone.

Expediently, a user of the hearing aid identifies the useful signal of the useful signal source by a user input during the operation of said hearing aid and the spectral characteristics are ascertained on the basis of the first directional signal and stored in a database. Here, the identification may be effectuated during running operation of the hearing aid; the user input may be effectuated by, in particular, a remote control or smartphone. This is particularly advantageous since the characteristics of all possible relevant useful signal sources are usually not known when the default is set, and consequently the user readily can add new useful signal sources, which are currently relevant to them on account of the current hearing situation, to the corresponding database.

Preferably, the signal of the first signal source is identified as useful signal during the operation of the hearing aid and the first signal source is predetermined as useful signal source, wherein the spectral characteristics of the useful signal source are ascertained on the basis of the first directional signal. In particular, the signal of the first signal source is identified as useful signal on the basis of an average of the signal level over time. This means that, for example, an unchanging high, long duration or recurring signal level for the conversation contributions of an interlocutor in a conversation situation is identified as a new, currently relevant useful signal and the spectral characteristics of the voice and speech of said interlocutor are ascertained accordingly for subsequent comparisons and stored accordingly. This facilitates a complete automatic capture of the spectral characteristics of a useful signal source without the user in this case having to direct particular attention to the capture itself.

Expediently, an output signal is formed on the basis of the first directional signal, said output signal being converted into a sound signal by at least one output transducer of the hearing aid. In general, an output transducer comprises an electro-acoustic transducer which is configured to produce a corresponding sound signal from an electric signal, for example a loudspeaker or a sound producer for bone conduction. Forming the output signal on the basis of the first directional signal should be understood to mean, in particular, that the first directional signal is used directly as input variable in the signal processing that is specific to the hearing aid, wherein the output signal is present as a resultant signal of the signal processing that is specific to the hearing aid. As a result, the temporal-spatial information, as included in the first directional signal in respect of the signal source in particular, is incorporated into the sound signal that is audible to the user of the hearing aid such that, as a consequence of modeling the real movement of the signal source by means of the first directional signal, a particularly realistic hearing sensation can be caused for the user.

In a further advantageous configuration, a specific speaker is predetermined as useful signal source and a human speech signal of the speaker is predetermined as useful signal. The method can be applied particularly advantageously, especially for the case of a speaker as useful signal source, since, firstly, a specific speech signal is identifiable on the basis of a multiplicity of spectral parameters that are characteristic for the voice and for the speech and, secondly, an interlocutor may move during a lively conversation situation, which can be compensated by the tracking of the interlocutor, proposed here, by the first directional signal for the purposes of improving the intelligibility of the speech signal.

Expediently, individual correction parameters are predetermined for the speech signal of the specific speaker in this case, wherein the first directional signal and/or an intermediate signal which is incorporated into the output signal is/are corrected on the basis of the individual correction parameters if the speech signal of the specific speaker is present in the first directional signal. What is advantageously exploited here is that, firstly, the specific speaker is identifiable and localizable by the hearing aid by way of the proposed method on the basis of spectral parameters that are characteristic for their voice and that, secondly, their speech signal can be amplified in a targeted manner, for example by virtue of the corresponding frequencies being able to be particularly amplified for less pronounced formats or the like.

In accordance with a particularly preferred feature of the invention, the individual correction parameters for the specific speaker are stored in a database of the hearing aid before the hearing aid is activated and/or said individual correction parameters for the specific speaker are ascertained on the basis of the first directional signal and a user input, and are stored in a database. Here, activation comprises both the first activation and an activation after a relatively long operational pause that is connected with an interim deactivation of the hearing aid. Here, in particular, the user input can be effectuated by way of a remote control or a smartphone. Particularly when storing the data within the scope of setting defaults prior to activation, corresponding correction parameters for the specific speaker can be adapted particularly accurately in a manner matched to a possible hearing loss of the user such that the storage space on the hearing aid required to this end can be optimized. Storing the correction parameters following a user input is advantageous in that the user can effectuate the storage independently and in any surroundings.

It was found to be advantageous if at least signal components of the first directional signal are transferred to an external unit, wherein the signal components of the first directional signal are examined in the external unit for the presence of the useful signal of a useful signal source that is predetermined in view of its type, and wherein the result of the examination of the first directional signal is transmitted to the hearing aid. This allows precisely the computationally intensive steps, which are required for identifying or verifying the useful signal source by way of the comparison of the corresponding spectral parameters, to be carried out outside of the hearing aid on a more powerful processor such that the processors of the hearing aid only need to be designed for a conventional hearing aid operation, which also comprises the formation of directional signals.

Advantageously, the first directional signal is transformed into the time-frequency domain and/or individual time periods of the first directional signal are examined for a signal-to-noise ratio in the time domain and/or in the time-frequency domain, wherein only time periods with a signal-to-noise ratio which lies above a predetermined second threshold are used for the examination for the presence of the useful signal. As a result, signal components which do not have a sufficiently high signal quality for examining the first directional signal in any case are neglected, as a result of which, overall, computational power can be saved.

In an advantageous configuration, the first direction for the assignment is ascertained on the basis of the first input signal and the second input signal. Depending on the quality of the signal source and the type of hearing situation, there can be an assignment of a spatial direction to a signal source, for example also by way of a default setting, for example on the basis of the assumption that a user of the hearing aid will usually align his direction of view with the direction of one of the useful signal sources, and so the frontal direction can be predetermined as a first direction. However, this is not expedient for many hearing situations. Therefore, it is advantageous to localize the first signal source on the basis of the first input signal and the second input signal, which are available in any case. Here, in particular, the first direction can be ascertained approximately, for example in the form of a scan over a plurality of angular ranges.

Expediently, a plurality of angle-dependent directional characteristics with a respective fixed central angle and a given angular width are formed in this case on the basis of the first input signal and the second input signal, wherein the signal components in the individual directional characteristics are examined for the presence of the signal from the first signal source, and wherein the corresponding central angle is assigned as first direction to a first signal source ascertained in a specific directional characteristic. This permits a localization of the first signal source that is particularly precise and robust against background noise since no time-of-flight or phase measurements, which are susceptible to interference, are used to this end, and the first direction for the first signal source can be predetermined on the basis of the available signals—of the first input signal and the second input signal—without further assumptions—e.g. frontal positioning or the like—being required to this end, said further assumptions possibly not corresponding to the real hearing situation.

Advantageously, an angular distance between two directional characteristics that are adjacent in respect of their respective central angle corresponds to half the angular width in this case. In particular, any two adjacent directional characteristics have the same angular width. In the case where the individual directional characteristics are formed by directional cones, the sensitivity of which is at a maximum in the direction of the central angle and decreases with increasing angular distance from the central angle, this means, in particular, that an angle can be specified for each individual directional characteristic, for which angle the sensitivity in respect of a test signal has dropped by a certain factor in relation to the maximum value at the central angle, for example by 6 dB or 10 dB. Such an angle is now assigned to the corresponding directional characteristic as half an angular width and the central angle of the adjacent directional characteristic is accordingly selected as twice the value of this angle. A corresponding statement may apply for the case where in each case notch-shaped attenuations of the sensitivity with a minimum at the central angle are selected as individual directional characteristics, wherein an increase in the sensitivity over the minimum value at the central angle is used for the definition of the angular width instead of the attenuation of the sensitivity in relation to the maximum value at the central angle. As a result of this, a largely complete coverage by the individual directional characteristics can be obtained for a desired, wide angular range while, as a consequence of the overlap of the individual directional characteristics up to the respective next central angle, a useful signal source always can be clearly assigned to at least one of the directional characteristics, wherein, as a result of the overlap, angular positions between two adjacent central angles also are resolvable.

It was found to be advantageous here if the individual directional characteristics respectively are predetermined by a notch-shaped sensitivity characteristic which is determined by at least two conditions such that a central angle and an angular width of the sensitivity characteristic are respectively set by the at least two conditions, and wherein the signal components in the individual directional characteristics are respectively examined for the presence of the signal from the first signal source on the basis of a relative attenuation by the sensitivity characteristic.

Here, a notch-shaped sensitivity characteristic should be understood to mean a directional characteristic which, in respect of a test signal with a given volume, has the maximum attenuation of the sensitivity at the central angle, with the sensitivity increasing with increasing angular distance from the central angle. The degree of this increase in sensitivity depending on the angular distance from the central angle then defines the angular width. If a signal source is situated in the direction of a central angle of such a directional characteristic, or if it is in the direct vicinity of the central angle within the scope of the angular resolution, i.e. if it is within the "notch" of the sensitivity characteristic, the signal components of the useful signal are substantially attenuated by the directional characteristic, while signal components from other signal sources which are situated outside of the angular width around the central angle of said directional characteristic are largely maintained. This now can be used for ascertaining presence of a signal source in the region of the corresponding directional characteristic.

It was found to be further advantageous if a second direction is assigned to a second signal source, wherein a second directional signal that is aligned in the second direction is formed on the basis of the first input signal and the second input signal, and wherein an output signal is formed on the basis of the first directional signal and the second directional signal, said output signal being converted into a sound signal by at least one output transducer of the hearing aid.

Forming the output signal on the basis of the first directional signal and on the basis of the second directional signal renders it possible to improve the signal-to-noise ratio for a first signal produced by the first signal source and for a second signal produced by the second signal source by virtue of noise which, in particular, originates from an angular range between the first signal source and the second signal source being able to be accordingly suppressed by the first directional signal and by the second directional signal and, consequently, not finding noticeable input in the output signal. In particular, the quality of the output signal improves as a result of this for a user of the hearing aid in respect of ambient noise incorporated into the first input signal and into the second input signal when the user is having a conversation with more than one interlocutor, wherein at least one of the interlocutors is moving and the conversation has background noise superposed thereon.

Then, the first direction and second direction are assigned to the interlocutors and the first directional signal and second directional signal are respectively aligned on a speaker such that the speech contributions of a speaker are amplified in relation to the ambient noise by way of the relevant directional signal. What is moreover achieved by aligning the first directional signal and the second directional signal on a speaker in each case is that the user need not follow speech activities of the interlocutors with head movements, for example in order to be able to maintain an improvement in the speech intelligibility by way of a fixedly predetermined directional characteristic.

Preferably, the first directional signal and the second directional signal are in this case incorporated into the output signal as a superposition, particularly preferably as a linear superposition. In particular, this means that, in this case, signal processing of the first directional signal and of the second directional signal can be effectuated, said signal processing being specific to the hearing aid, and the output signal is formed from the respectively resultant signals by way of a linear superposition or this means that a linear superposition of the first directional signal and of the second directional signal is incorporated into the signal processing that is specific to the hearing aid, and the output signal is formed by way of the signal processing. A linear superposition of the directional signals aligned on the useful signal sources has a particularly good correspondence to the real hearing situation, precisely for two or more useful signal sources, the first useful signal and the second useful signal also being subject to a linear superposition and the resultant sound signal intending to have the background noise removed therefrom by the hearing aid for improving the signal quality for the user in said real hearing situation.

Particularly preferably, linear factors for the first directional signal and for the second directional signal are respectively determined separately for each frequency band for the linear superposition in this case. In particular, this means that the linear superposition may provide different weighting of the first directional signal and of the second directional signal in different frequency bands. As a result of this, it is possible to account for possible spectral differences between the first useful signal source and the second useful signal source such that, for example, in the case of a frequency band in which only one of the two useful signal sources has noteworthy signal components, the corresponding weighting of the directional signal aligned to the useful signal source is higher. Particularly in the case where the first useful signal source and the second useful signal source respectively are interlocutors, it is consequently also possible to take account of characteristic spectral conditions of the voices of the interlocutors.

Expediently, at least signal components of the second directional signal are examined for the presence of a useful signal, wherein the weighting of the second directional signal relative to the first directional signal in the superposition is effectuated on the basis of the presence of a useful signal in the second directional signal. By way of example, what may be determined in a conversation situation is that a second speaker is in the vicinity, their conversation contributions being incorporated into the output signal with a higher weighting than if, for example, the second signal source is given by a localized background noise such as, for example, a loudspeaker playing back music. In the latter case, the corresponding music should also be included into the output signal in the correct solid angle range for appropriate spatial perception, but the speaker accordingly should preferably be clearly prioritized in the weighting in relation to the background music.

With the above and other objects in view there is also provided, in accordance with the invention, a hearing aid, in particular a binaural hearing aid, comprising at least a first input transducer for producing a first input signal from a sound signal from the surroundings, a second input transducer for producing a second input signal from the sound signal, and a signal processing unit which is configured to carry out the method described above. The advantages specified for the method and its developments may be transferred analogously to the hearing aid in this case.

Other features which are considered as characteristic for the invention are set forth in the appended claims.

Although the invention is illustrated and described herein as embodied in a method for operating a hearing aid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing is a schematic illustration of the course of a method for tracking a predetermined moving speaker with a directional signal of a hearing aid.

DETAILED DESCRIPTION OF THE INVENTION

Referring now to the FIGURE of the drawing in detail, there is shown schematically the course of a method 1 for operating a hearing aid 2. A user 4 of the hearing aid 2 is in conversation with a specific speaker 6 who moves relative to the user 2, for example walks up and down the room, wherein a further interlocutor 8 is party to the conversation, said interlocutor occasionally making contributions to the conversation, and background noise is moreover superposed on the conversation.

The hearing aid 2 has a first input transducer 10 and a second input transducer 12, which are respectively embodied as microphones. The first input transducer 10 produces a first input signal 16 from the incoming sound signal 14 from the surroundings, the second input transducer 12 producing a second input signal 18 from the incoming sound signal 14. Now, the direction in which significant sound sources are even positioned in relation to the frontal direction of the user 4 is initially ascertained in a localization step 20. By way of example, this can be effectuated by virtue of a multiplicity of directional characteristics being formed on the basis of the first input signal 16 and the second input signal 18, said directional characteristics respectively being aligned on a different center angle, i.e. having a maximum or a minimum of the sensitivity there. Subsequently, acoustic characteristics are formed on the basis of the signal components for the respective directional characteristic and the acoustic characteristics at the different angles are compared to one another, as a result of which, subsequently, it is possible to ascertain the presence of a signal source.

If, by way of example, the directional characteristics each have a conical embodiment, the maximum level—optionally averaged over a suitable time window—can be used as a characteristic. If the maximum level lies above a threshold for specific directional signals, the assumption is now made that a signal source is present in the corresponding direction—which is then equated to the center angle of the directional characteristic within the scope of the angle resolution of the localization step. If, by way of example, the directional characteristics each have a notch-shaped course of the sensitivity such that a minimum of the sensitivity is present at the center angle, the level which was normalized over the overall level can be used as a characteristic. The presence of a signal source in a directional characteristic is now ascertained on the basis of an attenuation of the level by the directional characteristic since the overall level, as a normalization factor, remains unaffected by the minimum of the sensitivity and a signal source in the region of the center angle is attenuated by the directional characteristic.

In the present case, the certain speaker 6 is ascertained as a first signal source 22 and the further interlocutor 8 is ascertained as a second signal source 24. The direction of the directional characteristic for which is extremal the acoustic characteristic is assigned to the certain speaker 6 as first direction 26. A comparable statement applies to the second direction 28, which is assigned to the further interlocutor 8.

Now, a first directional signal 30 aligned in the first direction 26 and a second directional signal 32 aligned in the second direction 28, each with a narrow conical directional characteristic, are formed in order to accentuate the signal from the first signal source 22 and from the second signal source 24 in relation to background noise. In the case where the localization step 20 was already carried out on the basis of conical directional characteristics, directional signals with the corresponding directional characteristics, in which the first signal source 22 and the second signal source 24, respectively, were localized, simply can be formed or continued to be used as first directional signal 30 and second directional signal 32.

Now, the first directional signal 30 and the second directional signal 32 are respectively transformed into the time-frequency domain TFD and signal components of the first directional signal 30 and of the second directional signal 32 are then respectively examined in respect of their signal-to-noise ratio SNR in the time-frequency domain TFD. Use is only made of those signal components 34 for which the signal-to-noise ratio SNR lies below a given threshold. Now, vectors of characteristic data 36 are formed from the signal components 34 derived from the first directional signal 30. Here, the characteristic data 36 is such that they can be related to previously stored, spectral characteristics 38 relating to the voice of the specific speaker 6. By way of example, this can be effectuated by way of a probability model which ascertains a probability value 40 for the first signal source 22 being given by the specific speaker 6 on the basis of the compatibility of the characteristic data 36 with the spectral characteristics 38 of the specific speaker 6. The first signal source 22 is identified as the specific speaker 6 if the probability value 40 lies above a predetermined threshold. Now, the first directional signal 30 can be used directly for further user-specific signal processing 42 in the hearing aid 2, for example increasing the level in specific frequency bands depending on an audiogram of the user 4. The output signal 44 of the signal processing 42 now is converted into a sound signal 48 that is audible for the user 4 by way of at least one output transducer 46, which is formed by a loudspeaker in the present case.

Here, in particular, the signal processing 42 also may comprise a speaker-specific correction by way of correction parameters 50 that are individual to the specific speaker 6, in which, for improving the speech intelligibility, specific frequency regions, for example at important formants, can be particularly accentuated in an intermediate signal, derived from the first directional signal 30, on the basis of known spectral parameters of the voice of the specific speaker 6.

If the specific speaker 6 is localized in the first direction 26, the localization step 20 can be repeated periodically in order thus to be able to track certain speakers 6 by way of the first directional signal 30. Here, monitoring by way of the characteristic data 36 and the spectral characteristics 38 ensures that, in the case of a realignment of the first direction 26, the first directional signal 30 continues to be aligned on the specific speaker 6. If this cannot be verified, i.e. if the sound signal of the signal source on which the first directional signal 30 was newly aligned is not compatible with the spectral characteristics 38 of the specific speaker 6, the current position of the specific speaker 6 can be sought after and the latter can be verified as a first, sought-after signal source 22 by a restart at the localization step 20 and the following subsequent steps. As a result of this, the specific speaker 6 can be continuously tracked by the first directional signal 30 such that their speech contributions can be amplified over the background noise by way of the first directional signal 30. By comparing the spectral characteristics 38 to the characteristic data 38, it is possible to ensure that the first directional signal is permanently aligned on the certain speaker 6—and not, for example, on the further interlocutor 8.

Even though the invention was illustrated and described in more detail by way of the preferred exemplary embodiment, the invention is not restricted by this exemplary embodiment. Other variations can be derived therefrom by a person skilled in the art, without departing from the scope of protection of the invention.

The following is a summary list of reference numerals and the corresponding structure used in the above description of the invention:

1 Method
2 Hearing aid
4 User
6 Specific speaker
8 Further interlocutor
10 First input transducer
12 Second input transducer
14 Incoming sound signal (from the surroundings)
16 First input signal
18 Second input signal
20 Localization step
22 First signal source
24 Second signal source
26 First direction
28 Second direction
30 First directional signal
32 Second directional signal
34 Signal components
36 Characteristic data
38 Spectral characteristics
40 Probability value
42 Signal processing
44 Output signal
46 Output transducer
48 Sound signal
50 Individual correction parameter TFD Time-frequency domain
SNR Signal-to-noise ratio

The invention claimed is:

1. A method of operating a hearing aid having a first input transducer for generating a first input signal from an ambient sound signal and a second input transducer for generating a second input signal from the ambient sound signal, the method comprising:
assigning a first direction to a first signal source;
forming a first directional signal that is aligned in the first direction based on the first input signal and the second input signal;
examining signal components of the first directional signal for a presence of a useful signal from a useful signal source that is predetermined in view of a type thereof;
predetermining spectral characteristics of the useful signal source for an examination of the signal components of the first directional signal for the presence of the useful signal; and
ascertaining a probability value for signal components that are compatible with the spectral characteristics contained in the first directional signal and deducing that a useful signal is present if the probability value exceeds a predetermined first threshold; and
which comprises defining a specific speaker as the useful signal source and determining a human speech signal of the speaker as the useful signal.

2. The method according to claim 1, which comprises ascertaining a position of the useful signal source on a basis of the first input signal and the second input signal if the useful signal is present in the first directional signal and, if a change in the position of the useful signal source to a modified position is ascertained, aligning the first directional signal in the direction of the modified position of the useful signal source.

3. The method according to claim 1, which comprises continuously updating the position of the useful signal source if the useful signal is present in the first directional signal.

4. The method according to claim 1, which comprises storing the spectral characteristics in a database of the hearing aid before the hearing aid is activated.

5. The method according to claim 1, wherein a user of the hearing aid identifies the useful signal of the useful signal source by a user input during the operation of the hearing aid and the spectral characteristics are ascertained on the basis of the first directional signal and stored in a database.

6. The method according to claim 1, which comprises:
identifying the signal of the first signal source as the useful signal during the operation of the hearing aid and determining the first signal source as the useful signal source; and
ascertaining the spectral characteristics of the useful signal source on a basis of the first directional signal.

7. The method according to claim 1, which comprises forming an output signal on the basis of the first directional signal, and converting the output signal to a sound signal by at least one output transducer of the hearing aid.

8. The method according to claim 1, which comprises:
defining individual correction parameters for the speech signal of the specific speaker; and
correcting the first directional signal and/or an intermediate signal which is incorporated into the output signal on a basis of the individual correction parameters if the speech signal of the specific speaker is present in the first directional signal.

9. The method according to claim 8, which comprises storing the individual correction parameters for the specific speaker in a database of the hearing aid before the hearing aid is activated and/or ascertaining the individual correction parameters for the specific speaker on the basis of the first directional signal and a user input, and storing the individual correction parameters in a database.

10. The method according to claim 1, which comprises:
transferring at least signal components of the first directional signal to an external unit;
examining the signal components of the first directional signal in the external unit for the presence of the useful signal of the useful signal source that is predetermined in view of the type thereof; and
transmitting a result of the examining step of the first directional signal to the hearing aid.

11. The method according to claim 1, which comprises:
transforming the first directional signal into the time-frequency domain and/or examining individual time periods of the first directional signal for a signal-to-noise ratio in the time domain and/or in the time-frequency domain and
using only time periods with a signal-to-noise ratio lying above a predetermined second threshold for an examination for the presence of the useful signal.

12. The method according to claim 1, which comprises ascertaining the first direction for the assignment on a basis of the first input signal and the second input signal.

13. The method according to claim 12, which comprises:
forming a plurality of angle-dependent directional characteristics with a respective fixed central angle and a given angular width on the basis of the first input signal and the second input signal;
examining the signal components in the individual directional characteristics for the presence of the signal from the first signal source; and
assigning a corresponding central angle as the first direction to a first signal source ascertained in a specific directional characteristic.

14. The method according to claim 13, wherein the individual directional characteristics respectively are predetermined by a notch-shaped sensitivity characteristic which is determined by at least two conditions such that a central angle and an angular width of the sensitivity characteristic are respectively set by the at least two conditions, and wherein the signal components in the individual directional characteristics are respectively examined for the presence of the signal from the first signal source on a basis of a relative attenuation by the sensitivity characteristic.

15. The method according to claim 1, which comprises:
assigning a second direction to a second signal source;
forming a second directional signal that is aligned in the second direction on a basis of the first input signal and the second input signal; and
forming an output signal on a basis of the first directional signal and the second directional signal; and
converting the output signal into a sound signal by an output transducer of the hearing aid for delivery to a user.

16. The method according to claim 15, which comprises superimposing the first directional signal and the second directional signal to form the output signal.

17. The method according to claim 16, which comprises:
examining at least signal components of the second directional signal for the presence of a useful signal; and effecting a weighting of the second directional signal relative to the first directional signal in the superposition based on the presence of a useful signal in the second directional signal.

18. A hearing aid, comprising:
a first input transducer for producing a first input signal from an ambient sound signal;
a second input transducer for producing a second input signal from the sound signal; and
a signal processing unit connected to said first and second input transducers and configured to carry out the method according to claim 1.

19. The hearing aid according to claim 18, configured as a binaural hearing aid.

20. A method of operating a hearing aid having a first input transducer for generating a first input signal from an ambient sound signal and a second input transducer for generating a second input signal from the ambient sound signal, the method comprising:
assigning a first direction to a first signal source;
forming a first directional signal that is aligned in the first direction based on the first input signal and the second input signal;
examining signal components of the first directional signal for a presence of a useful signal from a useful signal source that is predetermined in view of a type thereof;
predetermining spectral characteristics of the useful signal source for an examination of the signal components of the first directional signal for the presence of the useful signal; and
ascertaining a probability value for signal components that are compatible with the spectral characteristics contained in the first directional signal and deducing that a useful signal is present if the probability value exceeds a predetermined first threshold;
transforming the first directional signal into the time-frequency domain and/or examining individual time periods of the first directional signal for a signal-to-noise ratio in the time domain and/or in the time-frequency domain; and
using only time periods with a signal-to-noise ratio lying above a predetermined second threshold for an examination for the presence of the useful signal.

* * * * *